Inventor
LESLIE RIMES
By Rupert J. Brady
Attorney

June 28, 1966  L. RIMES  3,257,785
CROP-HANDLING APPARATUS
Filed Nov. 4, 1963  3 Sheets-Sheet 2

Inventor
LESLIE RIMES
By Rupert J. Brady
Attorney

June 28, 1966  L. RIMES  3,257,785
CROP-HANDLING APPARATUS
Filed Nov. 4, 1963 3 Sheets-Sheet 3
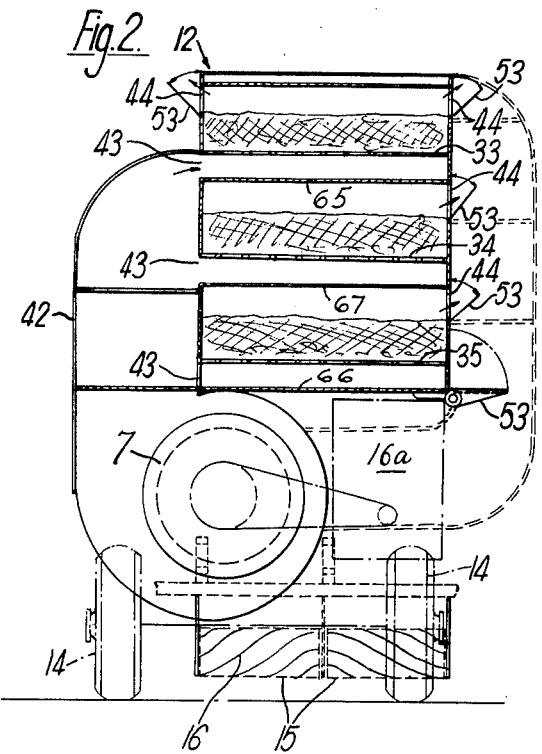
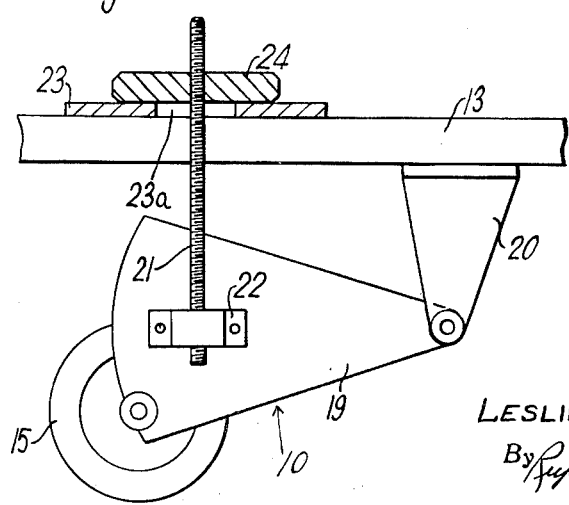
Inventor
LESLIE RIMES
By Rupert J. Brady
Attorney United States Patent Office 3,257,785
Patented June 28, 1966

3,257,785
CROP-HANDLING APPARATUS
Leslie Rimes, Tetbury, England, assignor to Leslie Rimes Limited, Tetbury, England
Filed Nov. 4, 1963, Ser. No. 321,304
6 Claims. (Cl. 56—10)

This invention relates to crop handling apparatus.

In the harvesting of grass or grass-like standing or growing crops (hereinafter and in the claims referred to simply as "crop") the practice hitherto has been to cut the crop and transport it to standing driers, some of which are mounted on wheels and known as mobile driers, whence it may be baled or ground and bagged as meal according to requirements.

Also, towed mobile driers have been proposed in which it is necessary to remove the wheels and move the drier on sled runners when it is desired to tow the drier over a standing crop.

It is an object of the present invention to provide apparatus which facilitates and expedites these operations so that the complete apparatus whether towed or self-propelled can move to the crop, thus reducing labour requirements and avoiding the need and cost of permanent sites and buidings.

The present invention is apparatus for harvesting a standing crop on being traversed thereover, the apparatus comprising in combination a cutter for cutting the crop, an endless conveyor for elevating the cut crop to an intake of a drier for drying the crop and including a stage for feeding the elevated crop on to supporting means therefor in the drier for progress through the drier to an exit, said stage being height adjustable relative to said supporting means to permit adjustment and control of the depth of the cut crop on said supporting means and the return reach of the conveyor at said stage being adapted to level the cut crop on said supporting means and return any surplus towards the cutter.

Preferably means is provided to permit height-adjustment of the cutter to a predetermined height above the ground, said height-adjusting means further permitting the cutter to yield to enable the cutter to ride over normal obstacles encountered when traversing the crop.

A wheeled trailer may also be provided adapted for towing attachment to said apparatus, the trailer mounting means for further treating the crop, for example means for milling and thereafter bagging the dried crop or means for baling the dried crop.

According to one aspect of the invention the stated combination is supported on a wheeled vehicle which may either incorporate its own power or be adapted for hitching to a powered tractor.

According to another aspect of the invention there is associated with the travelling drier a grinder or baler or other crop treating or processing means to suit requirements.

Embodiments of the present invention will now be described merely by way of example with reference to the accompanying drawings in which:

FIG. 2 is an end elevation view of the front of the apparatus taken in the direction of arrow A in FIG. 1 with parts removed for clearness;

FIG. 3 is an enlarged view, partly in section, of a fragmentary portion and a detail of FIG. 1.

Figure 1A:
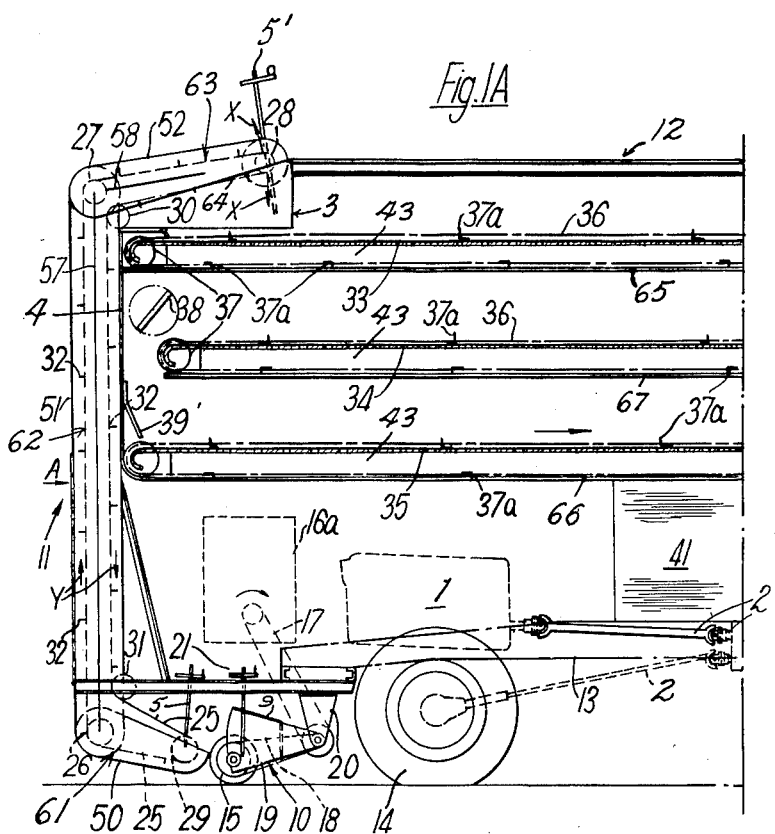
FIGS. 1A and 1B are side elevation views of the front and rear portions of apparatus according to the present invention for cutting a growing or standing crop, and conveying and drying the cut crop, the views are adapted to be placed end to end in order left to right, and a side wall of the apparatus being omitted in each view to illustrate the interior thereof.

Referring to the drawings, the apparatus comprising a cutter or mower mechanism 10, an elevator 11 and a drier 12 complete with hot air furnace 41 and blower 7 is mounted on a motor driven vehicle, the drier being supported on the chassis 13 of the vehicle and the chassis having ground engaging wheels 14. The driver's seat (not shown) on the vehicle is off-set to one side of the chassis so that the driver has an uninterrupted view as is common on industrial and agricultural machinery. The apparatus is self-propelled by means of a suitable engine 1 with a drive transmission 2 to the ground-engaging wheels.

The cutter or mower mechanism comprises two coaxial cylindrical cutter drums 15 with helical cutting blades 16. The use of two cutter drums instead of a single drum of length equivalent to the combined lengths of the two drums is preferable, but not essential, because such a single drum is difficult to machine and when in use is subject to deflection and whip. The drums 15 are mounted forwardly of the front pair of ground-engaging wheels 14 and are off-set to one side of the vehicle as shown in FIG. 2. The drums 15, which are rotated about their longitudinal axes by a motor 16a through belt drives 17, 18 incorporating suitable gearing, are attached to the chassis by pivotally interconnected brackets 19, 20, one bracket 20 being attached to the chassis. The drums are height adjustable relative to the ground as shown in FIG. 3 by means of a screw-threaded rod 21 attached to a bracket 22 bolted to the bracket 19, the rod extending upwards through an aperture 23a in a plate 23 attached to the chassis. A nut 24 is diameter at least twice that of the aperture in plate 23 is threaded on the free end of the rod and abuts against the upper face of the plate 23 to hold the drums 15 at a predetermined height relative to the ground. Should the drums encounter any obstacles on the ground, for example stones or clods of earth, when traversing the crop, the above-described height adjustment arrangement permits the drums to ride over the obstacle, the rod in this event penetrating further through the aperture 23a as bracket 19 pivots upward about its pivot connection with bracket 20, the nut thereafter again abutting against the plate 23 and holding the drums at their preset height when the obstacle has been passed and the rod falls back through the aperture.

Situated directly in front of the cutter drums is an endless conveyor or elevator 11 having a number of stages for conveying the cut crop to the top of the drier 12. The conveyor is adapted to be driven in the direction indicated by the arrows Y as will hereinafter be described. In this embodiment the conveyor comprises a first stage 61 inclined upward and forwardly from the cutter drums, and of a width extending the length of the cutter drums, a second stage 62 extending vertically upward substantially parallel to the front wall 4 of the drier and the front of the vehicle and a third stage 63 extending rearward and upward for delivery of the elevated cut crop into an opening 3 in the roof of the drier 12 the first 61 and third 63 stages being pivotally connected at 26 and 27 to the second stage 62 and their free ends about sprockets 29 and 28 being thus height adjustable, the direction of height-adjustment of the third stage being indicated by the arrows X The free end of the said first stage can be height adjusted by screw mechanism 5 so as to raise it in correct relationship with the cutter drums to receive the freshly cut crop effectively from the drums at any adjusted drum height As will be hereinafter described, the extent of the height adjustment of the third stage by mechanism 5′ limits the thickness or depth of the layer of cut crop passing through the drier and the height adjustment is chosen according to the degree of moisture content in the crop and the surrounding atmospheric conditions. At the same time the return reach 64 of the third stage of the endless conveyor 11 removes any surplus crop and returns it to the second stage and thence to the first stage. Conveniently the height-adjustment of at least the first stage can be achieved by apparatus 5, illustrated in FIG. 1A, similar to that employed with the cutter drums 15 as afore-described with reference to FIG. 3. The conveyor is substantially enclosed within covering plates 50, 51, 52, the covering plate 50 for the first stage of the conveyor being open-topped to permit the feeding of cut crop to the conveyor from the cutter drums, and the covering plate 52 for the third stage being open-bottomed to permit the crop to be discharged from the conveyor into the drier and to permit the lower reach 64 of the third stage of the conveyor to level the layer of cut crop on perforated plate 33 in the drier to the required depth as determined by the adjusted height of the third conveyor stage.

Figure 1B:
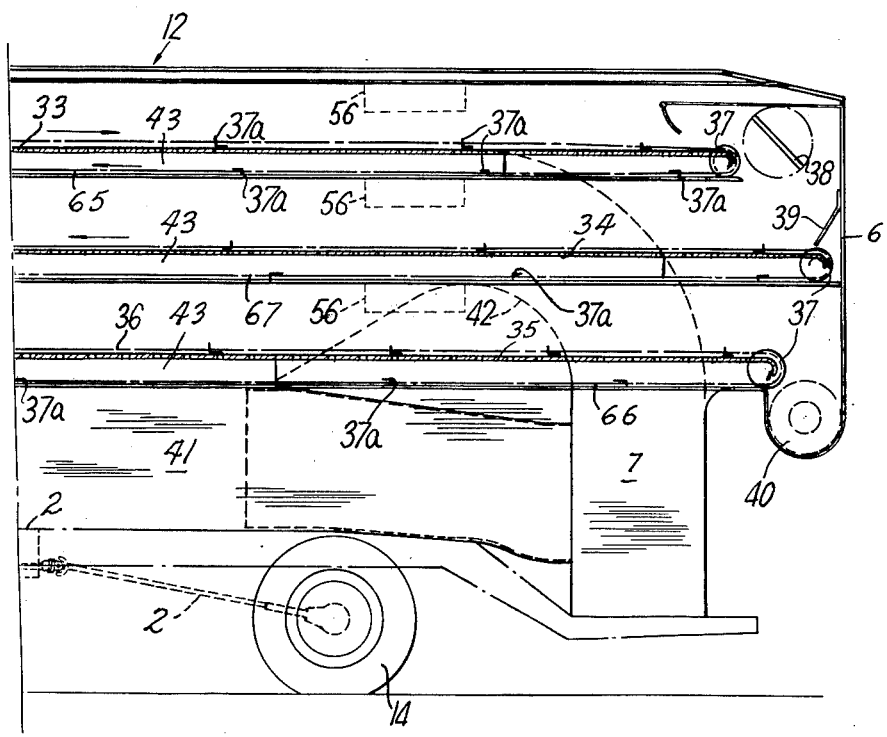

The cut crop is passed to the conveyor by being thrown forward by the cutter drums 15 on to an endless belt 25 running around sprockets 26, 27, 28 and 29 with tensioning wheels 30, 31 also provided. The crop is thrown forward through the cooperation of baffle hood 9 (FIG. 1A) with the centrifugal action of the cutter drums 15. Feed fingers or cross slats 32 are attached to the belt 25 to assist in conveying the cut crop to the drier intake, the return reach of the conveyor returning to the bottom of the conveyor any surplus crop as determined by the height of the third stage of the conveyor. The speed of travel of the appartus over the crop is adjusted to avoid accumulation of surplus cut crop in the conveyor The belt is driven in a clockwise direction, considering the FIG. 1 showing thereof, by one of the sprockets 27 which is belt driven from motor 16a through a speed reduction gear (not shown) in conventional manner. For example, if the cutter drums are rotated at 600 r.p.m. then the sprocket 27 would be rotated at 120 r.p.m. The direction in which the conveyor is driven makes the outside length of the endless conveyor 11 the feed length or reach and the inside length the return length or reach. A central plate 57 separates the vertical feed and return lengths of the conveyor from one another, and a plate 58 positioned between the feed and return lengths of the third stage of the conveyor extends only about half-way along the third stage from the sprocket 27 so as to permit the elevated crop to fall down on to the plate 33 providing the upper of the drying beds to be hereinafter referred to and be levelled thereon by the combing action of the feed fingers or cross slats 32 of the return length 64 of the third stage 63 of the conveyor.

Within the outer box-like casing of the drier 12 there are a number of vertically spaced horizontal drying beds, three being shown in the illustrated embodiment. Each drying bed comprises a perforated metal plate of length less than the inside length of the drier and plain underplates are provided beneath each perforated plate, alternate underplates being attached to alternate end walls of the drier 12, that is the underplates 65 and 66 beneath the first and third perforated plates 33, 35 respectively are attached to the front wall 4, i.e. the wall adjacent the vertical stage 62 of the conveyor 11, and the underplate 67 beneath the second plate 34 is attached to the rear wall 6. Both the perforated plates and underplates are connected to the side walls of drier 12. Two endless chains 36 each mounted around pairs of sprockets 37 are provided extending from front to back of each perforated plate 33, 34, 35 one along either side thereof. These chains 36 carry cross scrapers 37a which are L-shaped in vertical section and are suspended transversely over each plate, each such scraper extending across the width of the perforated plate and being attached at its ends to the respective two endless chains. When the drier is in use one of the sprockets 37 is driven to rotate the chains and scrapers, the scrapers serving as means for continuously progressing the cut crop along the length of the respective perforated plate. It will now be apparent that the height adjustment of the third elevator stage limits the permissible depth of the layer of cut crop deposited on the first or upper plate 33 and moved therealong by its scrapers and also determines the quantity of surplus crop, if any, returned to the first stage.

When the cut crop has been progressed along the first plate 33 towards the rear of the drier it falls down on to the second perforated plate 34 the associated chains and scrapers of which are rotated in the opposite direction to those of the first plate to progress the cut crop towards the front wall 4 of the drier. Rotating flails 38 are provided to turn the crop over and assist its passage between the plates 33, 34, 35, and a deflector 39 is provided to deflect the falling cut crop on to the second plate 34 from first plate 33, and deflector 39' is provided to deflect the falling crop onto third plate 35 from second plate 34. When the cut crop falls onto the third plate 35, the crop is progressed to the rear of the drier by its chains and scrapers where any suitable means, for example a transversely disposed rotating auger 40, is provided below plate 35 to expel it from the drier, to be passed, if desired, to apparatus for further treatment, for example to be either baled or ground and bagged by apparatus travelling with the vehicle either on the same chassis or on a separate trailer or trailers as illustrated in FIG. 4.

The three pairs of endless sprockets 37 are rotated at successively slower speeds, for example 5 r.p.m., 4 r.p.m., and 3 r.p.m. for the first, second and third drying beds respectively, the drive for these sprockets and for the flail and if necessary the auger also, being taken from one motor (not shown) in conventional manner.

To effect the drying of the cut crop as it is progressed through the drier, hot air supplied from air heating means, in this instance an oil-fired furnace 41 mounted on the chassis, is fed through ducting 42 (FIG. 2) into the drier by a blower fan illustrated generally at 7. The ducting 42 directs the hot air into the drier through inlet apertures 43 through one side wall of the drier along substantially the whole length thereof, these inlet apertures being located one directly underneath the level of each perforated plate 33, 34, 35 so that the hot air passes upwards within the drier through the perforations and thus through the cut crop, drying same. Hot air exit apertures 44 are located through the side walls of the drier and exit aperture closure flaps 53, hinged at their lower parts to the sidewalls of the drier 12, close the exit apertures whenever desired, for example to provide weather protection when the drier is out of use or to provide means for damping down combustion in the event of fire breaking out in the drier. When the drier is in use the flaps 53 can be hinged outwards from the drier, as shown in FIG. 2, to an angle of for example 45° thus to provide a certain amount of wind and weather protection and also to deflect the exhaust gases from the drier upwards. In a modification recirculation ducting is provided to couple any or all of the exit apertures 44 with ducting 56 from the blower fan as shown in dotted lines in FIGS. 1B and 2, to recirculate the hot air to assist in heating the air entering the drier to improve the efficiency of drying.

Figure 4:
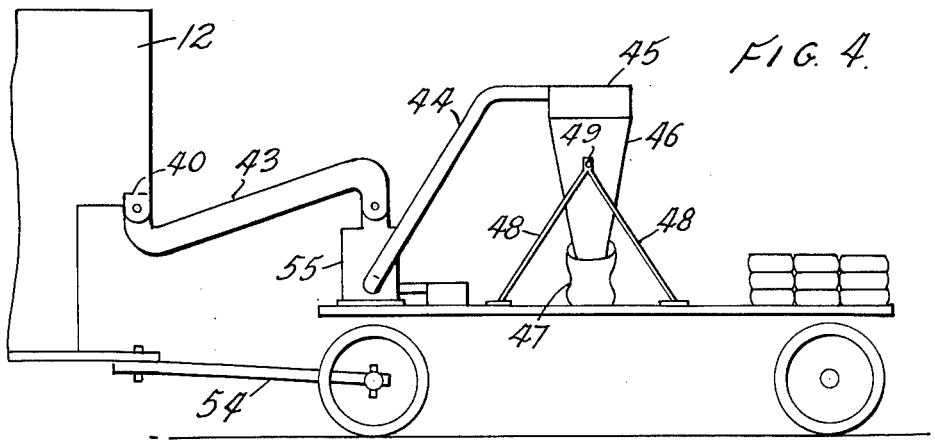
FIG. 4 is diagrammatic side view of a trailer mounting means for milling and thereafter bagging the dried crop attached to the rear of the apparatus of FIGS. 1A and 1B.

In FIG. 4, a wheeled trailer is shown mounting means for further continuous treatment of the cut and dried crop after is has been expelled from the drier. The trailer can be hitched by a tow bar 54 to the apparatus shown in FIGS. 1A and 1B mounting the cutter, conveyor and drier and has mounted on it a mill 55 for milling the dried crop and a cyclone and bagger apparatus for putting the milled crop into bags. The output of auger conveyor 40 (FIG. 1B) is connected to the mill by a conduit 43 which is attached to the auger and the mill 55 by swivel connections located respectively on the same vertical planes as the points of attachment of the tow bar 54 to the apparatus and the trailer, this ensuring that the conduit 43 is not subjected to excessive stretching, bending or other such forces when the trailer is being towed behind the apparatus.

The dried crop expelled from the drier by way of the auger, together with some of the heated air, is sucked through the conduit and into the mill by means of a fan (not separately shown) incorporated in the mill 55, the drying of the crop continuing during its passage through the conduit. The same fan blows the milled crop through a further conduit 44 to the cyclone and bagger apparatus.

The cyclone and bagger apparatus comprises a casing 45 having a conical casing 46 extending and tapering downwards therefrom and the lower end of which feeds into a suitably positioned bag 47, the conical casing distributing the milled crop evenly into the bag 47. A power driven fan (not separately shown) may be provided mounted in said casing 45 to assist in the distribution of the milled crop in the conical casing 46. When this bag 47 has been filled it is removed and stacked at the rear end of the trailer and an empty bag is connected to the conical casing. The cyclone and bagger apparatus is mounted on trunnions 48 to pivot at 49 about a horizontal axis, the longitudinal axis of the conical casing being vertical when the apparatus is in use. When transporting the apparatus between sites of operation it is possible to pivot the apparatus about the trunnions to a position in which the longitudinal axis of the conical casing is horizontal, thus reducing the overall height of the apparatus and facilitating transportation. Suitable conventional means not shown would also be provided to lock the cyclone and bagger apparatus in either of the above-described positions.

In use the apparatus is driven over the growing crop and the cutter drums cut the crop and throw it forward on to the conveyor which carries it into the top of the drier. The cut crop is progressed in zig-zag fashion through the drier over the drying plates, heated air from the oil-fired furnace being passed into the drier simultaneously. Finally, the cut and dried crop is ejected by way of the auger or other suitable means at the rear of the drier, and it may thereafter be baled, ground and bagged or otherwise treated as above-described.

While the invention has been shown and described in certain preferred embodiments it is realized that modifications can be made without departing from the spirit of the invention, and it is to be understood that no limitations upon the invention are intended other than those imposed by the scope of the appended claims.

I claim:

1. Wheeled vehicle apparatus for harvesting a standing crop on being traversed thereover, the apparatus comprising in combination a cutter connected beneath the vehicle for cutting the crop, an enclosed drier connected on said vehicle and extending substantially the length thereof for drying the crop, and having a front wall, an endless conveyor having at least first, second and third interconnected stages, said endless conveyor having an outer reach for elevating the cut crop and an inner return reach, said second conveyor stage vertically connected to the front of said vehicle and disposed parallel to the front wall of said drier, said first conveyor stage movably connected to one end of said second conveyor stage and extending beneath and rearwardly of said vehicle in a generally horizontal plane and having a free end terminating forwardly of said cutter for receiving cut crops therefrom, plural horizontally disposed drying beds connected in said drier for progressing the crop through the drier to an exit, said drier having a top opening adjacent the front wall and above the uppermost drying bed, said third conveyor stage movably connected to the other end of said second conveyor stage and extending rearwardly of said vehicle at an acute angle to said second conveyor stage through said drier opening and having a free end positioned to deposit cut crops on the uppermost drying bed, means connected to said third conveyor stage for adjusting the height thereof relative to the uppermost drying bed to permit adjustment and control of the depth of the cut crop thereon, and the return reach of said endless conveyor at said third stage disposed above and adapted to level the cut crop on the uppermost drying bed and return surplus thereon toward the cutter through said second and first stages.

2. Apparatus as set forth in claim 1 including an open topped cover member enclosing said first conveyor stage, and an open-bottomed cover member enclosing said third conveyor stage.

3. Apparatus as set forth in claim 1 in which said endless conveyor comprises a single power driven endless belt, and transversely disposed feed members attached thereto to convey the cut crop, and said feed members in the return reach of said third conveyor stage depending from said conveyor above the cut crop on the uppermost drying bed and adapted to level the same by combing action.

4. Apparatus as set forth in claim 1 in which said first conveyor stage extends forwardly and inclined upwardly toward said second conveyor stage from said cutter.

5. Apparatus as set forth in claim 1 in which said third conveyor stage extends rearwardly from said second conveyor stage and upwardly inclined relative to the uppermost drying bed.

6. Apparatus as claimed in claim 1 including an auger connected transverse of said drier to expel the cut crop from the drier exit.

References Cited by the Examiner

UNITED STATES PATENTS

| | | | |
|---|---|---|---|
| 1,255,982 | 2/1918 | Byers | 56—10 |
| 2,551,461 | 5/1951 | Pool et al. | 56—10 X |
| 2,608,310 | 8/1952 | De Penning. | |
| 2,632,989 | 3/1953 | Ross | 56—24 |
| 2,674,081 | 4/1954 | Hansen | 56—24 X |
| 2,756,554 | 7/1956 | Diehl et al. | 56—1 |
| 2,806,337 | 9/1957 | Rezabek | 56—1 |
| 2,811,004 | 10/1957 | Borrow | 56—1 X |

ABRAHAM G. STONE, *Primary Examiner.*

ANTONIO F. GUIDA, *Examiner.*